(12) United States Patent
Tolle et al.

(10) Patent No.: US 12,074,925 B2
(45) Date of Patent: Aug. 27, 2024

(54) METHODS, SYSTEMS, AND MEDIA FOR PRESENTING USER COMMENTS CONTAINING TIMED REFERENCES IN SYNCHRONIZATION WITH A MEDIA CONTENT ITEM

(71) Applicant: Google LLC, Mountain View, CA (US)

(72) Inventors: Gilman Tolle, San Francisco, CA (US); Eileen Margaret Peters Long, San Jose, CA (US); Brian Becker, Portola Valley, CA (US); Xiaxiang Lin, Mountain View, CA (US); Siobhan Quinn, San Francisco, CA (US); Antonia Hidalgo, San Francisco, CA (US); Nikhil Dandekar, San Francisco, CA (US); Mengya Tang, San Francisco, CA (US); Fangxiaoyu Feng, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/666,459

(22) Filed: Feb. 7, 2022

(65) Prior Publication Data
US 2023/0254350 A1 Aug. 10, 2023

(51) Int. Cl.
*H04L 65/401* (2022.01)
*H04L 51/046* (2022.01)
(Continued)

(52) U.S. Cl.
CPC ........ *H04L 65/4015* (2013.01); *H04L 51/046* (2013.01); *H04L 51/212* (2022.05); *H04L 51/216* (2022.05)

(58) Field of Classification Search
CPC . H04L 65/4015; H04L 51/216; H04L 51/212; H04L 51/046; H04N 21/4788
See application file for complete search history.

(56) References Cited

U.S. PATENT DOCUMENTS 8,713,618 B1 * 4/2014 Kuznetsov ......... H04N 21/8133
725/38
2012/0150997 A1 * 6/2012 McClements, IV ........................
G06Q 10/101
709/217

(Continued)

OTHER PUBLICATIONS

International Search Report and Written Opinion dated Apr. 18, 2023 in International Patent Application No. PCT/US2023/010180.
(Continued)

*Primary Examiner* — Lesa M Kennedy
(74) *Attorney, Agent, or Firm* — Shumaker & Sieffert, P.A.

(57) ABSTRACT

Methods, systems, and media for presenting user comments containing timed references in synchronization with a media content item are provided. In some embodiments, a method for presenting user comments during media playback that includes: obtaining a plurality of comments associated with a media content item; determining a subset of comments from the plurality of comments that contains at least one of a plurality of timed references to the media content item; determining a series of time windows, wherein each time window in the series of time windows corresponds to a segment of the media content item; associating one or more comments from the subset of comments with a time window from the series of time windows, wherein the time window contains a time referenced in a comment; receiving a request to receive comments that are synchronized with playback of the media content item; and, in response to receiving the request to receive comments that are synchronized with playback of the media content item, causing a first comment associated with a first time window to be presented concurrently with a first portion of the media content item that corresponds with the first time window and a second comment associated with a second time window to be presented (Continued)

concurrently with a second portion of the media content item that corresponds with the second time window.

21 Claims, 6 Drawing Sheets

(51) Int. Cl.
*H04L 51/212* (2022.01)
*H04L 51/216* (2022.01)

(56) References Cited

U.S. PATENT DOCUMENTS

| | | | |
|---|---|---|---|
| 2012/0233254 A1* | 9/2012 | Koizuka | H04N 21/8456 |
| | | | 709/204 |
| 2014/0044407 A1 | 2/2014 | Kuznetsov | |
| 2014/0137151 A1* | 5/2014 | Roberts | H04N 21/8133 |
| | | | 725/32 |
| 2014/0199046 A1 | 7/2014 | Lindsey et al. | |
| 2016/0057092 A1* | 2/2016 | Liao | G06F 16/951 |
| | | | 709/206 |
| 2017/0229152 A1* | 8/2017 | Loganathan | G06F 16/735 |
| 2018/0041463 A1* | 2/2018 | Liao | G06Q 50/01 |

OTHER PUBLICATIONS

Response to Communication Pursuant to Rules 161(1) and 162 EPC dated Sep. 27, 2023, from counterpart European Application No. 23705703.9, filed Apr. 5, 2024, 17 pp.

* cited by examiner

FIG. 1

200 anon123 — 1 day ago
that pause when he said it's the closest he'll get to playing a comic book hero... what you trying to say jim — 201 userABC — 2 days ago
1:29 – did john just confirm that he is actually going to be in a superhero movie?! — 202

Anon_and on and on — 1 month ago
Next week on SGN: John K assembles all Alien races in the closest 10,000 galaxies to thank the helpers and nurses for their work. — 203 anon_ominous — 3 months ago
The part where he showed Michael running was the best 6:35 — 204

Taco-bout-it — 6 months ago
"Everybody's got a job right?"
Me (being the 13 year old I am): nope. No I do not... — 205

Anon_xyz — 8 months ago
8:25 When I have to do the dishes in the middle of an online game. — 206

Jane_Dough — 1 year ago
1:30 What about "The Adventures of Jimmy H"? — 207

METHODS, SYSTEMS, AND MEDIA FOR PRESENTING USER COMMENTS CONTAINING TIMED REFERENCES IN SYNCHRONIZATION WITH A MEDIA CONTENT ITEM

TECHNICAL FIELD

The disclosed subject matter relates to methods, systems, and media for presenting user comments containing timed references in synchronization with a media content item.

BACKGROUND

Users frequently use websites associated with particular services or applications associated with particular services to view media content (e.g., stream or download media content, such as music, television shows, movies, videos, etc.), connect with other users (e.g., via social networking services), perform tasks (e.g., purchase items, edit documents, receive or send messages, etc.).

Such services often include sections for viewers to submit comments on media content being consumed. For example, a creator that has uploaded media content to a media sharing service can allow viewers to submit one or more comments to the uploaded media content, where the submitted comments can be presented along with the media content. Comments often contain viewer attitudes or reactions to the media content. In some instances, a viewer can react to a specific moment in the media content by adding a timestamp of that moment in their comment along with any other commentary. These comments, however, are typically provided linearly in a comments section, where the comments are displayed in an order in which the comment was received from the viewer (e.g., newest comments first) or in an order based on endorsements of the comment from other viewers (e.g., most liked comments first). As such, reviewing through submitted comments to a video or any other media content can be a burdensome task for the viewer.

Accordingly, it is desirable to provide new mechanisms for presenting user comments containing timed references in synchronization with a media content item.

SUMMARY

In accordance with some embodiments of the disclosed subject matter, methods, systems, and media for presenting user submissions containing timed references in synchronization with a media content item are provided.

In accordance with some embodiments of the disclosed subject matter, a method for presenting user comments during media playback is provided, the method comprising: obtaining a plurality of comments associated with a media content item; determining a subset of comments from the plurality of comments that contains at least one of a plurality of timed references to the media content item; determining a series of time windows, wherein each time window in the series of time windows corresponds to a segment of the media content item; associating one or more comments from the subset of comments with a time window from the series of time windows, wherein the time window contains a time referenced in a comment; receiving a request to receive comments that are synchronized with playback of the media content item; and, in response to receiving the request to receive comments that are synchronized with playback of the media content item, causing a first comment associated with a first time window to be presented concurrently with a first portion of the media content item that corresponds with the first time window and a second comment associated with a second time window to be presented concurrently with a second portion of the media content item that corresponds with the second time window.

In some embodiments, associating one or more comments from the subset of comments with the time window from the series of time windows further comprises determining that a second plurality of comments are associated with the first time window.

In some embodiments, the method further comprises determining a ranking for each of the second plurality of comments. In some embodiments, the ranking is based on a number of endorsements associated with each of the second plurality of comments in the first time window.

In some embodiments, the series of time windows associated with the media content item is determined based on a density of comments having the timed reference from the plurality of timed references, wherein the second plurality of comments are associated with the time window having a start time and an end time in response to determining that the density of comments between the start time and the end time being greater than a threshold value.

In some embodiments, the method further comprises generating a filtered set of user-generated comments by filtering the plurality of user-generated comments to remove user-generated comments containing objectionable content, wherein the subset of user-generated comments that contains the at least one of the plurality of timed references to the media content item are determined from the filtered set of user-generated comments.

In some embodiments, the method further comprises causing a selectable option to be presented that switches the user-generated comments from being presented as received from one or more viewers of the media content item to being synchronized with playback of the media content item.

In accordance with some embodiments of the disclosed subject matter, a system for presenting user comments during media playback is provided, the system comprising a memory and a hardware processor, where the hardware processor is configured to: obtain a plurality of comments associated with a media content item; determine a subset of comments from the plurality of comments that contains at least one of a plurality of timed references to the media content item; determine a series of time windows, wherein each time window in the series of time windows corresponds to a segment of the media content item; associate one or more comments from the subset of comments with a time window from the series of time windows, wherein the time window contains a time referenced in a comment; receive a request to receive comments that are synchronized with playback of the media content item; and, in response to receiving the request to receive comments that are synchronized with playback of the media content item, cause a first comment associated with a first time window to be presented concurrently with a first portion of the media content item that corresponds with the first time window and a second comment associated with a second time window to be presented concurrently with a second portion of the media content item that corresponds with the second time window.

In accordance with some embodiments of the disclosed subject matter, a non-transitory computer-readable medium containing computer executable instructions that, when executed by a processor, cause the processor to execute a method for presenting user comments during media playback is provided, the method comprising: obtaining a plurality of comments associated with a media content item;

determining a subset of comments from the plurality of comments that contains at least one of a plurality of timed references to the media content item; determining a series of time windows, wherein each time window in the series of time windows corresponds to a segment of the media content item; associating one or more comments from the subset of comments with a time window from the series of time windows, wherein the time window contains a time referenced in a comment; receiving a request to receive comments that are synchronized with playback of the media content item; and, in response to receiving the request to receive comments that are synchronized with playback of the media content item, causing a first comment associated with a first time window to be presented concurrently with a first portion of the media content item that corresponds with the first time window and a second comment associated with a second time window to be presented concurrently with a second portion of the media content item that corresponds with the second time window.

In accordance with some embodiments of the disclosed subject matter, a system for presenting user comments during media playback is provided, the system comprising: means for obtaining a plurality of comments associated with a media content item; means for determining a subset of comments from the plurality of comments that contains at least one of a plurality of timed references to the media content item; means for determining a series of time windows, wherein each time window in the series of time windows corresponds to a segment of the media content item; means for associating one or more comments from the subset of comments with a time window from the series of time windows, wherein the time window contains a time referenced in a comment; means for receiving a request to receive comments that are synchronized with playback of the media content item; and, in response to receiving the request to receive comments that are synchronized with playback of the media content item, means for causing a first comment associated with a first time window to be presented concurrently with a first portion of the media content item that corresponds with the first time window and a second comment associated with a second time window to be presented concurrently with a second portion of the media content item that corresponds with the second time window.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments of the disclosed subject matter, mechanisms (which can include methods, systems, and media) for presenting user comments containing timed references in synchronization with a media content item are provided.

Generally speaking, the mechanisms described herein can identify and present comments that are relevant to the content being presented in a media content item. More particularly, in response to associating comments into multiple time windows generated for a media content item and selecting a comment for each of the multiple time windows (e.g., a top comment for each time window, the top three comments for each time window, etc.), the mechanisms can concurrently present the selected comment or comments along with the media content item that is currently at a playback position that corresponds with the associated time window.

In some embodiments, the mechanisms can include retrieving the comments that are associated with a media content item. The mechanisms can, for example, determine a subset of comments from the retrieved comments that include a timed reference to a portion of the media content item. In another example, the mechanisms can determine that each comment in the subset of comments is relevant to a portion of the media content item. In a more particular example, for comments in which a reference to a particular time or a timestamp is not included within the text portion or body of the comment, the mechanisms can determine that a comment in the subset of comments is relevant to a moment within the media content item (e.g., based on the text portion or body of the comment describing or concerning a moment that occurs in the media content item) and can assign the comment to a timestamp or a time window within the media content item corresponding to the moment.

In some embodiments, the mechanisms can determine a series of time windows for the media content item and can assign comments into each of the time windows. For example, the mechanisms can generate a series of time windows based on the duration of the media content item (e.g., five-second windows for videos having a duration of two minutes). In continuing this example, comments can be assigned into each of these time windows based on the associated time reference (e.g., a comment including text that refers to a playback position of 1:32 in a video can be assigned in a five-second time window having a start time of 1:31 and an end time of 1:35). In another example, the mechanisms can generate time windows based on comment density, engagement data, any other suitable criterion. In yet another example, the mechanisms can generate time windows that correspond to chapters, segments, or other video sections designated within the media content item (e.g., chapters and chapter start times that were designated by a creator of a media content item, sections that were automatically generated by a machine learning model based on interesting scenes or increased user engagement within a media content item, etc.).

In some embodiments, the mechanisms can rank and/or select the comments associated with each of the time windows. For example, the mechanisms can rank the comments based on relevancy to the content being presented in the time window, based on engagement data, etc. In continuing this example, the mechanisms can, based on the ranking, select one or more comments for association with a particular time window (e.g., top three comments for a time window between 1:00 and 1:05 based on the ranking).

The mechanisms can then present timed comments in synchronization with the playback of the media content item. For example, a first comment can be promoted or otherwise presented during the presentation of the media content item at an associated first time window and a second comment can be promoted or otherwise presented during the presentation of the media content item at an associated second time window. These timed comments can be presented, for example, in response to receiving a user-selected interface element to receive comments that are synchronized with playback of the media content item. For example, a comments interface that currently presents comments in the order in which the comment was received (e.g., newest comment first) can be updated to present the timed comments selected in accordance with the mechanisms described herein. In another example, a comments overlay interface can be generated to present a timed comment selected in accordance with the mechanisms described herein, where the comments overlay interface can be positioned adjacent to the media content item (e.g., a comments overlay interface that is presented below a video, a comments overlay interface that is positioned within a top portion of the video, etc.).

These mechanisms can be used in any suitable application. For example, these mechanisms can be used to automatically modify the comments region associated with a media content item to present comments about the current timestamp of the media content item without requiring user scrolling. In another example, these mechanisms can be used to identify user-generated content that refers to a product or a service appearing within a media content item. In a more particular example, these mechanisms can be used to present timed references to specific products or services being promoted by a creator of the media content item, where an overlay interface presents supplemental content associated with a product or service relevant to a moment in a media content item. In another more particular example, these mechanisms can be used to present timed advertisements or timed sponsorship information during particular portions of the media content item.

Figure 1:
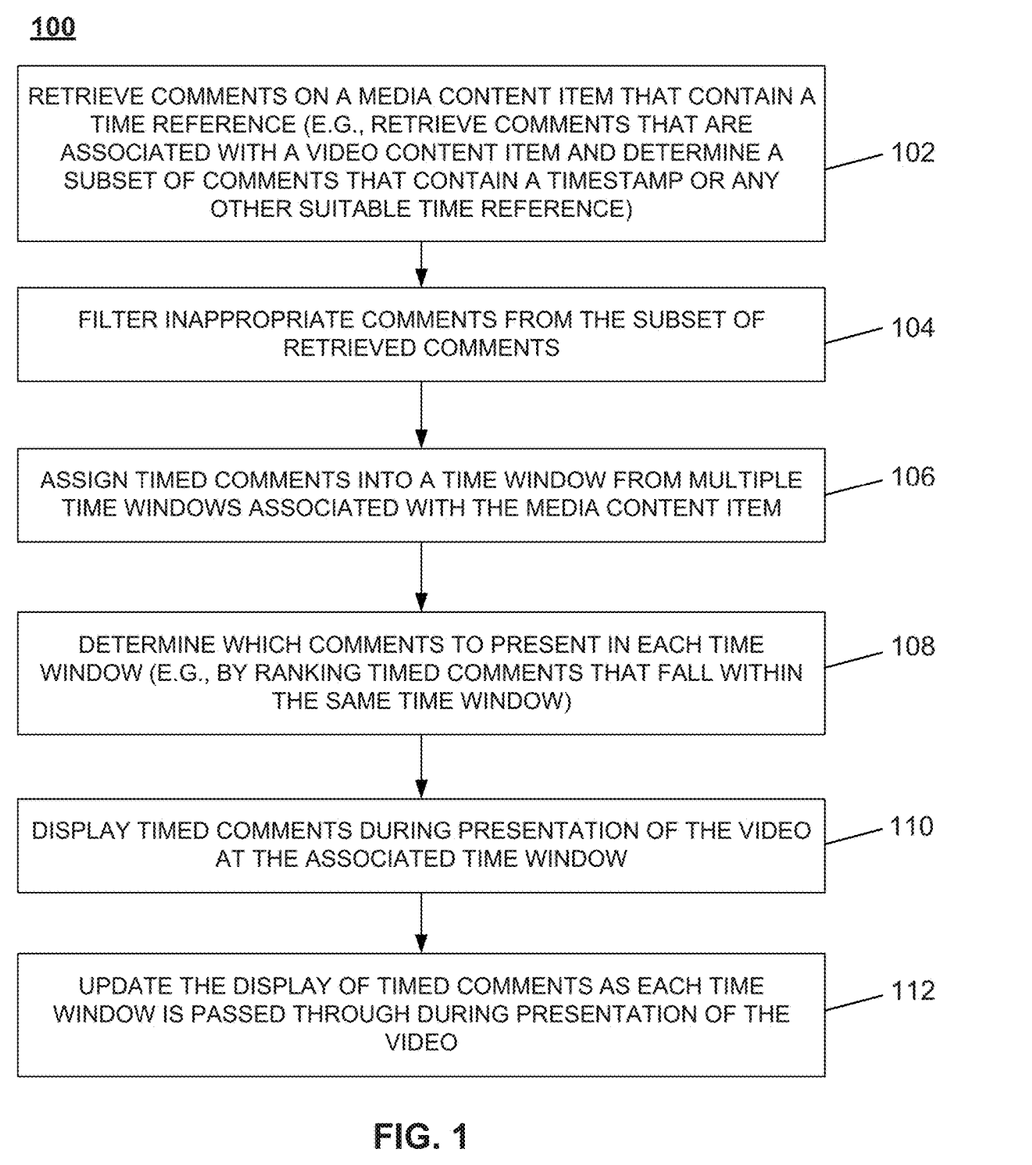
FIG. 1 shows an example flow diagram of a process for presenting comments containing timed references in synchronization with a media content item in accordance with some embodiments of the disclosed subject matter.

Turning to FIG. 1, an example flow diagram of a process 100 for presenting user submitted comments containing timed references in synchronization with a media content item in accordance with some embodiments of the disclosed subject matter is shown. In some embodiments, process 100 can run on a server such as server 402 and/or a user device such as user devices 406, described below in connection with FIG. 4.

It should be noted that process 100 can be executed at any suitable time. For example, in some embodiments, process 100 can be executed by a server in response to receiving a request from a user to play a media content item. In a more particular example, process 100 can be executed on a server hosting the media content item in response to receiving a request to stream a media content item to a user device. In another example, in some embodiments, process 100 can be executed periodically in connection with any suitable indexing service that indexes and/or compiles statistical data (e.g., view counts, likes or any other suitable endorsements, new and/or revised comments, etc.) associated with media content items. In yet another example, in some embodiments, process 100 can be executed when process 100 (or any other suitable mechanism) detects a new comment associated with a given media content item.

In some embodiments, process 100 can begin, at 102, by retrieving comments or any other suitable user-generated submissions associated with a media content item using any suitable technique or combination of techniques. For example, comments that are associated with a media content item (e.g., a video that has been uploaded to a media sharing service) can be received at a server device (e.g., server device 402 as described in connection with FIG. 4) when submitted by a user of a user device (e.g., user device 404 as described in connection with FIG. 4). In such an example, process 100 can access, request, and/or retrieve the comments from the server device. In a more particular example, in response to transmitting a request that includes a media content identifier that identifies the media content item or a portion of the media content item, the server device can access comments and associated comment information from a comments database. The comment information from the comments database can include a comment identifier that identifies the comment, an author identifier that identifies a user account associated with a user or a group of users, a representation of the author that created, modified, and/or posted the comment, a timestamp that indicates the time when the comment was created, the content of the comment, a media content identifier that identifies the media content item or a portion of the media content item relating to the comment, etc. As another example, comments can be included in the metadata associated with the media content item. In such an example, process 100 can access, request, and/or retrieve the comments associated with the media content item concurrently with the metadata associated with the media content item (e.g., the title of the media content item, a description of the media content item, the content creator of the media content item, etc.).

Figure 2:
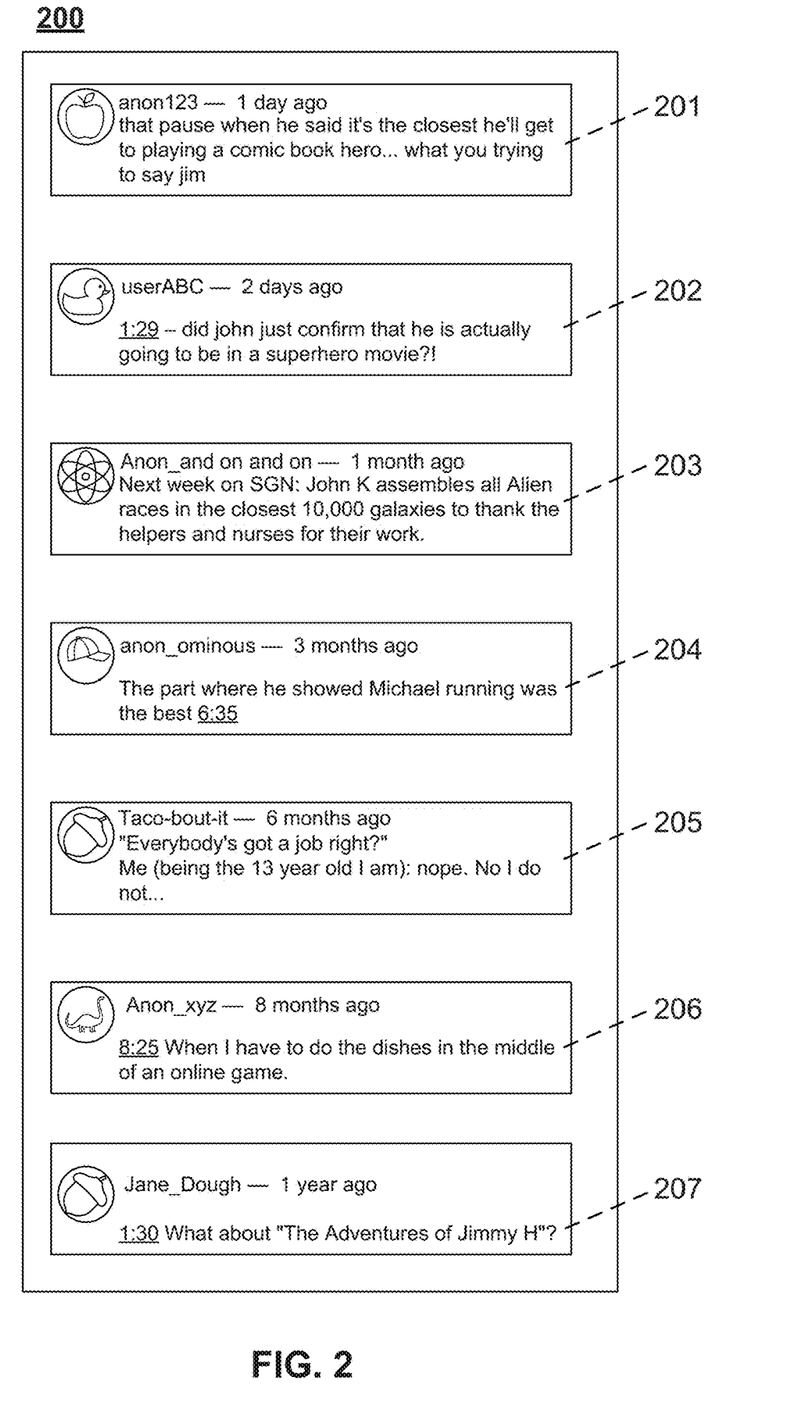
FIG. 2 shows an illustrative example of user submitted comments associated with a video in accordance with some embodiments of the disclosed subject matter.

In a more particular example, FIG. 2 shows an illustrative example 200 in which comments associated with a video were submitted by multiple users in accordance with some embodiments. As illustrated, comments interface 200 can include any number of comments 201-207. As also illustrative, comments 201-207 that are associated with a particular video can be presented in the order in which the comment was submitted (e.g., newest comments first).

In some embodiments, process 100 can identify a subset of the retrieved comments that contain a reference to a particular time within the media content item. For example, in some embodiments, process 100 can identify comments within the retrieved comments that are associated with a media content item that include a timestamp within the content of the comment (e.g., the comment "I see what you did here at 1:30," the comment "3:47," etc.). Additionally or alternatively, in some embodiments, process 100 can identify comments within the retrieved comments that include characters that are indicative of a time reference to a position within the media content item, such as the inclusion of an "@" symbol within the content of the comment (e.g., the comment "What is going on here @ 3:45"). Additionally or alternatively, in some embodiments, process 100 can identify comments within the retrieved comments that include a link to a position within the media content item. For example, a portion of a comment that contains a link can be differentiated by using one or more of the following techniques: highlighting; underlining; bolding; italicizing; being presented in a different color; being presented at a different size; being presented using a different font; etc.

Additionally or alternatively, in some embodiments, process 100 can identify a subset of the retrieved comments that contain a reference to a particular time within the media content item by determining whether the content of the comment matches, correlates, or is otherwise similar to an audio portion from a particular time in the media content item using any suitable approach.

For example, in instances in which the comment includes text, process 100 can compare the text from the comment with text from the media content item to determine if there is any correlation between the text of the comment and the text of the media content item. A correlation can exist, for example, if the comment includes a quotation or a paragraph of a quotation from the media content item. In a more particular example, process 100 can compare the text from the comment with a transcript or closed captioning data for the media content item to determine if there is a correlation between the text of the media content item and dialogue or other words (whether spoken or written) in the media content item (e.g., via the comparison with transcript or captioning data).

In another example, in instances in which the comment includes text, process 100 can input the text from the comment into a context model that determines whether the comment is referring to or otherwise relevant to media content being presented within the media content item. For example, the context model can determine that a particular entity appears at a particular time within the media content item (e.g., Michael is running in this scene) and can determine that the text from the comment refers to the particular entity (e.g., the comment includes the text "The part where he showed Michael running was the best").

In yet another example, in instances in which the comment includes text but does not include a reference to a particular time or a timestamp within the text of the comment, process 100 can determine whether the comment is relevant to a moment without the media content item. In a more particular example, the media content item can be inputted into a machine learning model that identifies key moments within the media content item and process 100 can determine whether the comment corresponds with one of the identified key moments within the media content item. In another more particular example, the media content item and user engagement data associated with the media content item can be inputted into a machine learning model that identified moments within the media content item that correspond with high user engagement (e.g., user engagement greater than a particular threshold amount) and process 100 can determine whether the comment corresponds with one of the identified moments within the media content item. In some embodiments, process 100 can determine a degree of correlation between portions of the comment and portions of the media content item based on a comparison between comment data and the media content item. For example, the degree of correlation can represent how similar (or dissimilar) a portion of the comment is from one or more portions of the media content item. For instance, if a commenter quotes a portion of the media content item, but misspells a word, the quote from the comment can be considered closely correlated with the quoted portion of the content item. Alternatively, if a comment has one word (or a few words) in common with a portion of the media content item, the portion containing the common word is not likely to be closely correlated, except in some instances where the word in common is a word that is unique to the content or otherwise rarely used. In continuing this example, a comment can be associated with a particular portion of the media content based on the degree of correlation being greater than a particular threshold value.

In some embodiments, a correlation score can be generated for a comment based on the degree of correlation between a portion of the comment and a portion of the media content item. For example, a comment that contains a portion that directly quotes or describes a particular portion of a media content item can be scored more highly for that portion of the media content item than a comment that does not contain a quotation from that portion of the media content item. In continuing this example, comments having a correlation score that is greater than a particular threshold value can be associated with the portion of the media content item.

In yet another example, in instances in which the comment includes text, process 100 can input the text from the comment into a text model that predicts whether the comment relates to a moment or time position within the media content item. In response, the text model can provide scores for the comment as to whether the comment is relevant to media content being presented at particular time positions within the media content item.

It should be noted that although comments are described as containing text, comments can contain any suitable type of content, such as video or image content, which can be analyzed to extract data using techniques similar to techniques used for analyzing content items to extract data. For example, in instances in which the comment includes an image or a video snippet, process 100 can compare the image or one or more images within the video snippet of the comment with image content from the media content item to determine if there is any correlation between the image in the comment and the image content in the media content item. In another example, process 100 can be implemented to determine whether a product or a service being promoted by a creator of a media content item corresponds to image content in the media content item. In yet another example, process 100 can be implemented to determine whether sponsorship information corresponds to image content in the media content item.

It should also be noted that although a subset of the retrieved comments that contain a reference to a particular time within the media content item is identified, this is merely illustrative. For example, the subset of the retrieved comments can be identified to include particular keywords, particular mentions of products or services, etc. In another example, process 100 can be used to determine whether a product or service being promoted by a creator of a media content item corresponds with a moment in the media content item, where an overlay interface can present supplemental content associated with the product or service that is relevant to the moment in the media content item. In yet another example, process 100 can be used to determine whether a timed advertisement or timed sponsorship information corresponds with a moment in the media content item, where an overlay interface can provide the timed advertisement or the timed sponsorship information.

In some embodiments, process 100 can filter inappropriate and/or objectionable comments from the subset of retrieved comments that contain a reference to a particular time within the media content item at 104. For example, in some embodiments, process 100 can filter out comments containing harassing language, profanity, and/or which violate any terms of use, community policies, etc., for the service which facilitates the submission of comments on media content items. In a more particular example, process 100 can input the subset of retrieved comments into an objectionable content model that compares the text or other content of the comment, where the objectionable content model has been trained with a training set of comments containing examples of objectionable content (e.g., swear words, harassing language, etc.). In another example, in some embodiments, process 100 can filter out comments in which other users have disliked (e.g., a number of dislikes greater than a particular threshold value), reported (e.g., in response to selecting a report interface element in the comment window), or otherwise marked as containing inappropriate content.

In some embodiments, at 106, process 100 can assign the remaining comments into a time window from multiple time windows associated with the media content item. For example, each of the remaining comments can be assigned to a corresponding time window of the media content item based on the reference to the particular time within the media content item.

In a more particular example, the media content item can be divided into a series of time windows based on the duration of the media content item. For example, for a video that has a duration of ninety seconds, a series of five second time windows can be created for the media content item in which at least one comment is assigned to each of the time windows. In continuing this example, in response to determining that a comment contains a timestamp of 0:33 (thirty-three seconds) for a video that has a duration of ninety seconds, the comment can be associated with a five second time window having a start time of 0:31 (thirty-one seconds) and an end time of 0:35 (thirty five seconds).

It should be noted that the media content item can be divided into time windows using any other suitable data and/or metadata associated with the media content item.

For example, the media content item can be divided into time windows based on video chapters created by the creator of the media content item, advertisement breaks inserted into the media content item, closed-captioning tracks, etc. This can include, for example, video chapters and chapter start times that were designed by the creator of the media content item. This can also include, for example, video segments or any other suitable section that were automatically generated by inputting the media content item into a machine learning model, where the machine learning model can output video segments and associated timestamps based on interesting scenes, increased user engagement, and/or any other suitable criterion.

In another example, the media content item can be divided into time windows having varying length based on the density of the comments and/or based on engagement data associated with each of the comments. For example, a time window can be generated for a media content item in response to determining that a high density of comments is associated with the time window—e.g., between 1:00 and 1:15 and between 1:33 and 1:55 of a media content item, a particular number of comments have been submitted and the engagement data associated with these comments indicates a particular number of likes, shares, endorsements, etc. In continuing this example, process 100 can generate time windows for the media content item based on the density of the comments or based on the amount of user engagement in which a time window is generated between time windows having high comment density and/or high user engagement.

It should be noted that process 100 can use any suitable approach to sort, match, order, pair, and/or otherwise determine the time window in the media content item that corresponds to the time reference in the timed comment. It should also be noted that a timed comment can be assigned to more than one time window, for instance, in an example where a timed comment contains two or more timestamps or in an example where a timed comment is relevant to two or more portions of the media content item.

In response to assigning each of the comments into a time window (e.g., assigning comment A1 into a time window spanning 1:00 and 1:05 of the video based on the contents of comment A1), process 100 can continue to 108 and determine which comment or comments to present when the media content item is being presented at the particular time window. For example, for each time window, process 100 can rank and select the comments to present to a viewer of the media content item in a comments section during playback of the media content item—e.g., comment $\{C_1\}$ for a time window from $T_1$ to $T_2$, comment $\{C_2\}$ for a time window from $T_2$ to $T_3$, top comments $\{C3, C4, C5\}$ for a time window from $T_3$ to $T_4$, etc.

In some embodiments, process 100 can determine that multiple comments are associated with a particular time window. In response, process 100 can rank the comments according to any suitable ranking condition. For example, the comments associated with the particular time window can be ranked by relevancy to the media content being presented in the particular time window. In a more particular example, as described above, each comment can be associated with a degree of correlation or a correlation score with the portion of the media content and each comment can be ranked by the degree of correlation or the correlation score (e.g., from highest correlation score to lowest correlation score). In continuing this example, a particular number of top ranked comments can be associated with the particular time window (e.g., the comment having the highest correlation score, the top three comments having the highest correlation scores, each comment having a correlation score greater than a particular threshold value, etc.).

Process 100 can associate, in a video index, a video identifier (e.g., video ID 123456) with multiple time window identifiers (e.g., timestamp ID_1, timestamp ID_2, etc.) and, for each time window identifier, one or more comments (e.g., comment ID_1 and comment features, comment ID_2 and comment features, etc.). In response to transmitting a query that includes the video identifier to the video index, the video index can return the one or more comments that can be presented during the presentation of the media content in each time window of the video.

It should be noted that any suitable number of comments can be selected for each time window. For example, for a time window in which the density of comments is greater than a particular threshold value (e.g., a high comment density), additional comments can be selected as opposed to a time window having a low density of comments in the time window (e.g., one comment is selected for time window A having a low comment density) and three comments are selected for a time window B having a high comment density). In another example, for a time window in which the engagement data indicates that the viewers have endorsed the comments in the time window (e.g., comments in the time window have more than a particular threshold number of likes), additional comments can be selected as opposed to a time window having engagement data that indicates that viewer have not reacted to the comments in the time window (e.g., one comment is selected for time window A having comments with low engagement) and three comments are selected for a time window B having comments with high engagement).

It should also be noted that process 100 can perform this selection of comments for each time window associated with the media content item and can determine that any suitable number of timed comments (including zero) occur in any suitable number of time windows.

At 110, process 100 can cause the selected comments to be presented at the assigned time window during presentation of the media content item. For example, the selected comments can be presented in a comments interface concurrently with the presentation of the media content item. In another example, the selected comment or comments can be presented in an overlay interface along with the media content item (e.g., a comments overlay interface that is presented below a video, a comments overlay interface that is positioned within a top portion of the video, a comment teaser interface that includes a single selected comment that is positioned adjacent to a video on a video watch page, etc.).

In some embodiments, process 100 can cause the selected comments to be displayed separately from comments that were not identified at 102 to contain timed references. For example, in some embodiments, the selected comment corresponding to the particular playback position in the media content item can be presented in a comment interface positioned beneath the video on a video watch page. In some embodiments, process 100 can cause a user interface to display the timed comments at the determined time windows in any suitable order, including in an order determined by the ranking at 108. In some embodiments, process 100 can cause only a portion of the timed comments in a given time window to be displayed (e.g., the top 3 most relevant comments in a highly commented segment).

At 112, process 100 can, in some embodiments, update the display of timed comments as the presentation of the media content item progresses. For example, after the first five-second duration containing one timed comment, process 100 can cause the timed comment display to be updated with any suitable number of timed comments that have been selected and associated with the second five-second duration of the video.

In some embodiments, process 100 can provide a commenter with the opportunity to author timed comments while viewing timed comments associated with the media content item. For example, a commenter can create a new comment having a timed reference and, in response, the new comment can be associated with a time window of the media content item and can be ranked against the comments associated with the particular time window. In another example, in response to creating a new comment having a timed reference, process 100 can indicate that such a new comment would be considered a timed comment and that process 100 can determine whether the new comment would be selected as a top comment for association with a particular time window of the media content item. In yet another example, in response to creating a new comment having a timed reference, process 100 can indicate that such a new comment would be selected as the top comment for a particular time window based on the ranking and/or selection performed at 108.

In some embodiments, process 100 can remove the timed comments displayed at 110 and/or can determine that no timed comments are to be presented in connection with the subsequent time window. In some embodiments, process 100 can take any suitable action, such as displaying no timed comments for the duration of that time window, continue to present the timed comment from a previous time window or previous time windows, present a timed comment associated with an upcoming time window, and/or any other suitable action.

Note that, while process 100 can cause the display of timed comments at 110 and 112, process 100 can, in some embodiments, cause non-timed comments to be displayed at 110 and at 112, as shown and discussed below in connection with FIGS. 3A and 3B. In some embodiments, any other suitable mechanism can determine when and how to display comments that are not included in the timed comments identified at 102 of process 100.

Figure 3A:
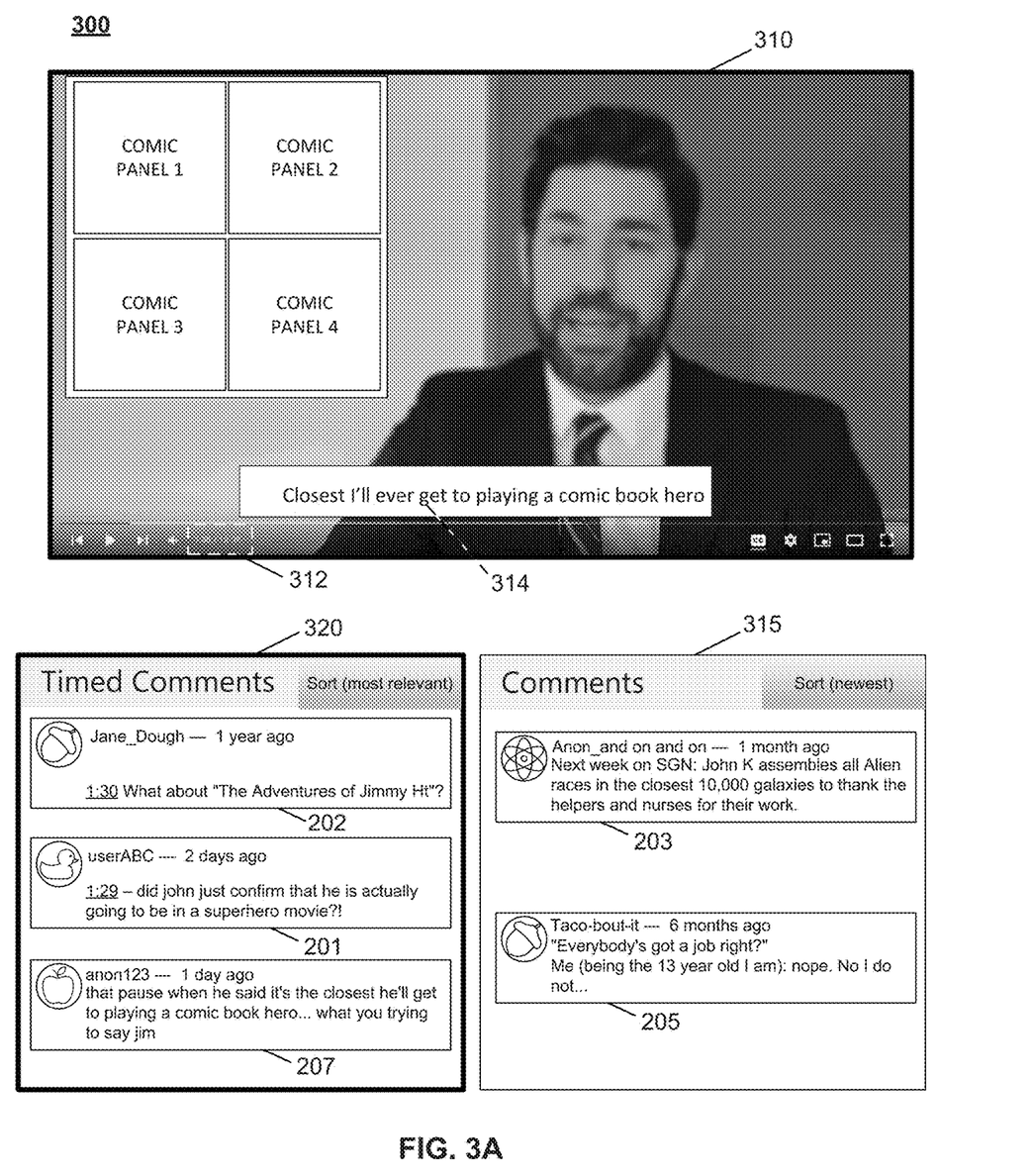
FIGS. 3A and 3B show illustrative display screens of comments containing timed references in synchronization with a media content item in accordance with some embodiments of the disclosed subject matter.
Figure 3B:
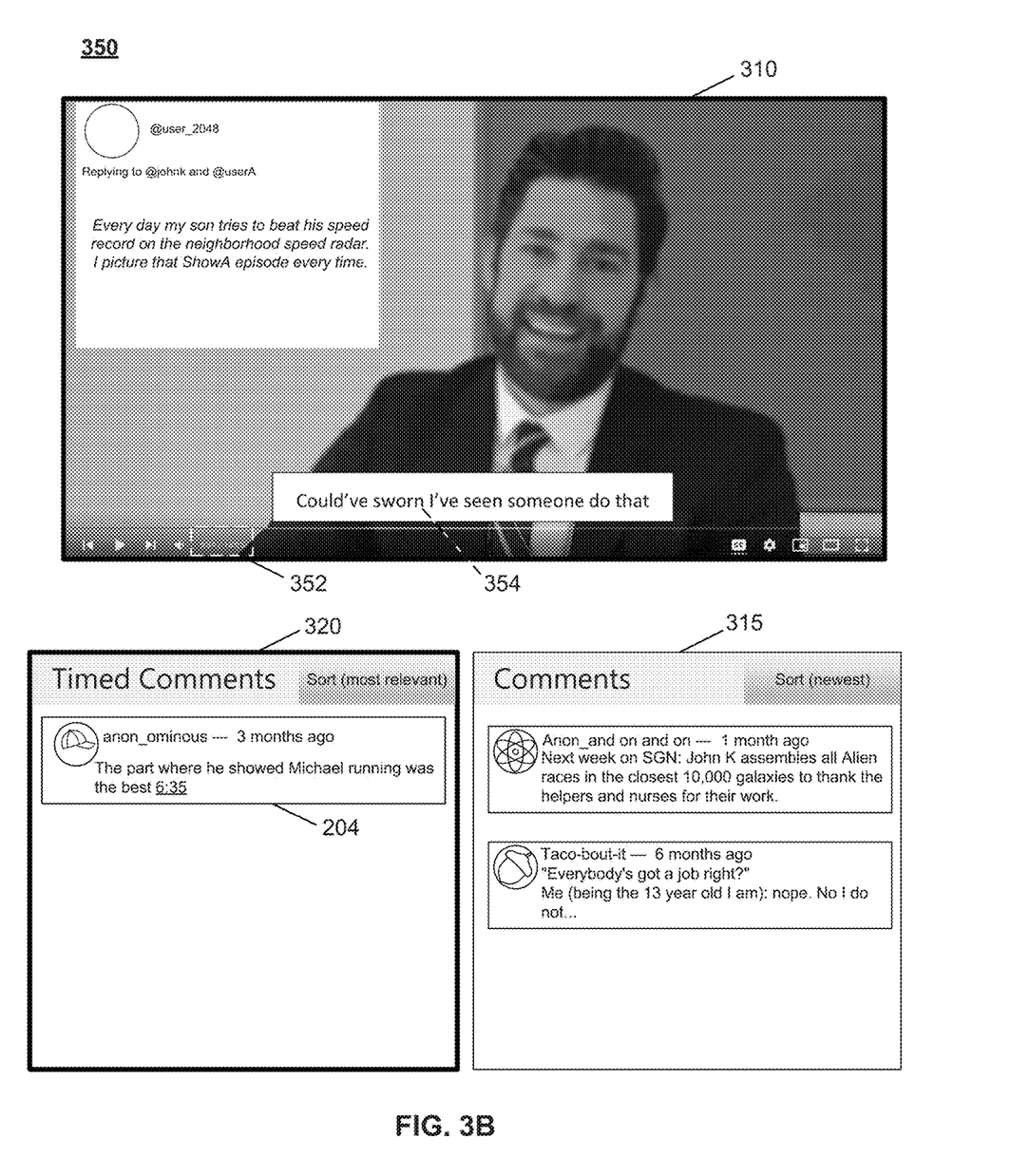

Turning to FIG. 3A, an illustrative example 300 of a display screen containing comments having timed references in synchronization with a media content item is shown in accordance with some embodiments of the disclosed subject matter. As illustrated, display 300 can include media content item 310 at playback time 312, closed caption 314, comments interface 315, and timed comments interface in some embodiments. In some embodiments, the comments in comments interface 315 and the comments in timed comments interface 320 can be submitted by users having user accounts, as discussed in connection with FIG. 2. In some embodiments, any suitable device(s) can be used to present display screen 300, such as user devices 406 as discussed in FIG. 4 below.

In some embodiments, media content item 310 can be any suitable song, video, clip, and/or other media content item. In some embodiments, media content item 310 can be streamed from a remote content source or stored locally for playback. For example, in some embodiments, media content item 310 can be a social media post that includes a video portion and an audio portion. In another example, in some embodiments, media content item 310 can be a podcast downloaded and/or streamed from a podcast feed.

In some embodiments, playback time 312 can be included in display screen 300. For example, as shown in FIG. 3A, the current playback time 312 is 1 minute and 30 seconds out of a total media content item duration of 18 minutes and 5 seconds. In some embodiments, playback time 312 can be omitted from display screen 300, and can be included in metadata of media content item 310. In some embodiments, playback time 312 can be formatted in any suitable time format.

In some embodiments, closed caption 314 can be automatically created by a text generation program, and/or can be included with media content item 310 by the media content creator(s). In some embodiments, closed caption 314 can be omitted from display screen 300. In some embodiments, closed caption 314 can be stored in metadata included with media content item 310 and can be used to identify timed references in user submitted comments, as discussed above in connection with FIG. 1.

In some embodiments, display screen 300 can include the comments in comments interface 315, where the comments can be any comments that do not contain an identified timed reference. In some embodiments, the comments in comments interface 315 can be displayed in any suitable order, such as most relevant, most recent, oldest, etc. In some embodiments, any suitable number of comments can be included in comments interface 315. In some embodiments, comments interface 315 can be omitted.

In some embodiments, timed comments interface 320 can include any suitable comments containing a timed reference. In some embodiments, the comments displayed in timed comments interface 320 can be identified using any suitable approach, such as process 100 described in connection with FIG. 1 above. As illustrated, timed comments interface 320 includes comment 202, comment 201, and comment 207. As discussed above in connection with FIG. 2, comment 202 includes a timestamp of 1 minute and 30 seconds (1:30), comment 201 includes a timestamp of 1 minute and 29 seconds (1:29), and comment 207 includes a reference that is matched or otherwise correlated to the content being presented at timestamp 312. In some embodiments, comments 202, 201, and 207 can be included in timed comments interface 320 based on a time window determined during process 100 as discussed above in FIG. 1. For example, in some embodiments, timestamp 312 can be referenced in comments 202 and 201. In another example, in some embodiments, comment 207 can be included in timed comments 320 based on identification (by process 100 and/or any other suitable approach) that user submitted text in comment 207 substantially overlaps with closed captions 314 and/or an audio track at timestamp 312.

In some embodiments, timed comments interface 320 can include any suitable number of comments. For example, timed comments interface 320 can present a single comment for a particular amount of time—e.g., the top comment for the entirety of a ten-second time window of a media content item. In continuing this example, in instances in which multiple comments are ranked and selected for a particular time window, timed comment interface 320 can be configured to present a first comment for five seconds (e.g., the top ranking comment for that time window) and a second comment for the next five seconds (e.g., the comment having the next highest ranking).

In some embodiments, in which multiple comments are presented within timed comments interface 320, timed comments interface 320 can display comments in any suitable order, such as most relevant, most recent, oldest, etc.

Additionally or alternatively to presenting comments interface 315 and timed comments interface 320, display screen 300 can present timed comments interface 320 in response to receiving a selected preference from a user of display screen 300. For example, display screen 300 can include a timed comment interface element that, when selected, replaces the comments interface, such as the comments interface shown in FIG. 2 in which comments are presented in the order in which the comment is received, with timed comments interface 320 in which selected comments that are associated with the particular time window are presented concurrently with the media content item.

Additionally or alternatively to presenting comments interface 315 and timed comments interface 320, display screen 300 can present timed comments interface 320 as an overlay interface. For example, a selected timed comment associated with a time window that corresponds with a particular playback position in the media content item can be presented as an overlay beneath the media window or in a top portion of the media content item (e.g., when the media content item is being played back in full screen mode).

In some embodiments, timed comments interface 320 can be updated, changed, altered, and/or remain the same as media content item 310 progresses. For example, in some embodiments, timed comments interface 320 can remove comments 202, 201, and 207 from display screen 300 once media content item 310 progresses beyond the time(s) referenced in comments 202, 201, and 207. In another example, as shown in a display screen 350 of FIG. 3B, media content item 310 can, at playback time 352, display comment 204 which includes a timestamp of 6 minutes and 35 seconds. In some embodiments, comment 204 can be included in timed comments interface 320 based on a time window determined during process 100 as discussed above in FIG. 1. For example, in some embodiments, timestamp 352 or a timestamp within a certain window (e.g., 5 seconds of timestamp 352) can be included in comment 204.

In some embodiments, playback time 352 can be included in display screen 350. For example, as shown, playback time 352 is 6 minutes and 34 seconds out of a total media content item duration of 18 minutes and 5 seconds. In some embodiments, playback time 352 can be omitted from display screen 350, and/or can be included in metadata of media content item 310. In some embodiments, playback time 352 can be formatted in any suitable time format.

In some embodiments, closed caption 354 can be automatically created by a text generation program, and/or can be included with media content item 310 by the media content creator(s). In some embodiments, closed caption 354 can be omitted from display 350. In some embodiments, closed caption 354 can be stored in metadata included with media content item 310 and/or can be used to identify timed references in user submitted comments, as discussed above in connection with FIG. 1.

Figure 4:
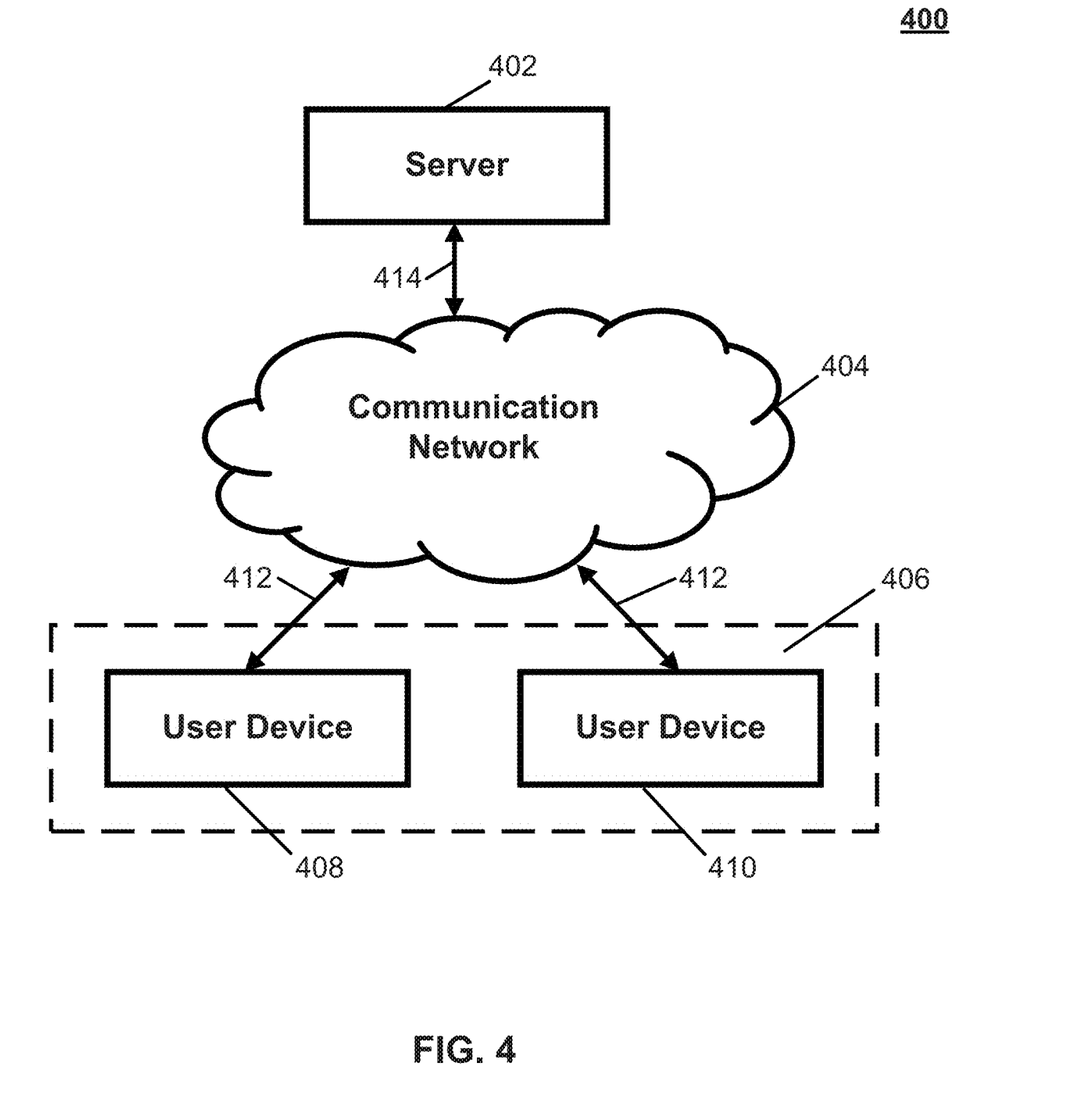
FIG. 4 shows an example block diagram of a system that can be used to implement mechanisms described herein in accordance with some embodiments of the disclosed subject matter.

Turning to FIG. 4, an example 400 of hardware for presenting comments containing timed references in synchronization with a media content item in accordance with some embodiments is shown. As illustrated, hardware 400 can include a server 402, a communication network 404, and/or one or more user devices 406, such as user devices 408 and 410.

Server 402 can be any suitable server(s) for storing information, data, programs, media content, and/or any other suitable content. In some embodiments, server 402 can perform any suitable function(s).

Communication network 404 can be any suitable combination of one or more wired and/or wireless networks in some embodiments. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for use with process 100. In some embodiments, user device 406 can include any suitable type of user device, such as speakers (with or without voice assistants), mobile phones, tablet computers, wearable computers, laptop computers, desktop computers, smart televisions, media players, game consoles, vehicle information and/or entertainment systems, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid overcomplicating the figure, any suitable number of user devices, (including only one user device) and/or any suitable types of user devices, can be used in some embodiments.

Server 402 and user devices 406 can be implemented using any suitable hardware in some embodiments. For example, in some embodiments, devices 402 and 406 can be implemented using any suitable general-purpose computer or special-purpose computer and can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 504, an antenna 516, and a bus 518.

Figure 5:
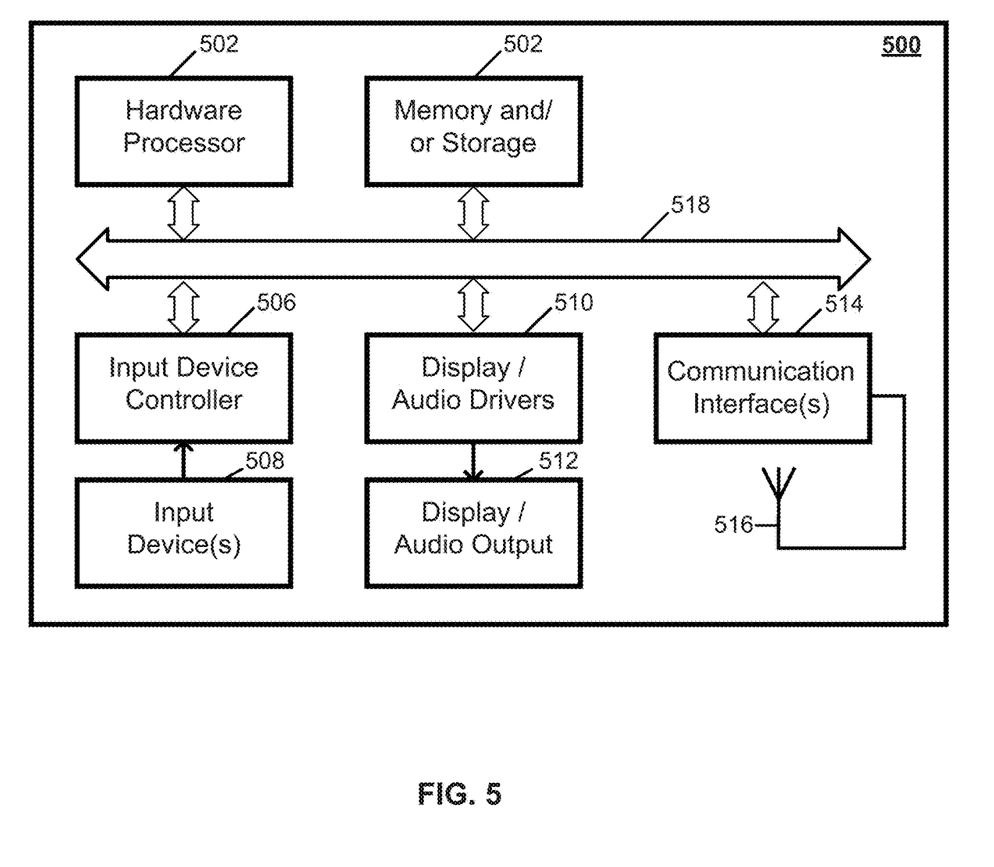
FIG. 5 shows an example block diagram of hardware that can be used in a server and/or a user device of FIG. 4 in accordance with some embodiments of the disclosed subject matter.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a computer program stored in memory and/or storage 504. For example, in some embodiments, the computer program can cause hardware processor 502 to perform functions described herein.

Memory and/or storage 504 can be any suitable memory and/or storage for storing programs, data, documents, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from a mouse, from one or more buttons, from a voice recognition circuit, from one or more microphones, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks, such as network 404 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for presenting user comments during media playback, the method comprising:
    obtaining a plurality of comments associated with a media content item;
    determining a subset of comments from the plurality of comments, wherein each respective comment from the subset of comments includes a text portion from which at least one of a plurality of timed references to a position of the media content item is extracted from the respective comment;
    determining a series of time windows, wherein each time window in the series of time windows corresponds to a segment of the media content item, and wherein the series of time windows includes at least a first time window and a second time window;
    associating a first plurality of comments from the subset of comments with the first time window and a second plurality of comments from the subset of comments with the second time window,
        wherein each respective timed reference from the plurality of timed references includes a reference to the position of the media content item extracted from each respective comment from the first plurality of comments and the second plurality of comments, and wherein each respective timed reference corresponds with a time within a respective time window from the series of time windows;
    receiving a request to receive comments that are synchronized with playback of the media content item; and
    in response to receiving the request to receive comments that are synchronized with playback of the media content item, causing:
        presentation of at least a portion of the first plurality of comments associated with the first time window within a timed comments interface concurrently with a first portion of the media content item that corresponds with the first time window and presentation of a comments interface that includes comments from the plurality of comments that are not within the subset of comments, and
        presentation of at least a portion of the second plurality of comments associated with the second time window within the timed comments interface concurrently with a second portion of the media content item that corresponds with the second time window and presentation of the comments interface that includes the comments from the plurality of comments that are not within the subset of comments.

2. The method of claim 1, further comprising: associating a third plurality of comments from the subset of comments with the first time window.

3. The method of claim 2, further comprising determining a ranking for each of the third plurality of comments.

4. The method of claim 3, wherein the ranking is based on a number of endorsements associated with each respective comment from the third plurality of comments in the first time window.

5. The method of claim 2, wherein the series of time windows associated with the media content item is determined based on a density of comments having a given timed reference from the plurality of timed references, wherein the second plurality of comments are associated with the second time window having a start time and an end time in response to determining that the density of comments between the start time and the end time being greater than a threshold value.

6. The method of claim 1, further comprising generating a filtered set of comments by filtering the plurality of comments to remove comments containing objectionable content, wherein the subset of comments that contains the plurality of timed references to the media content item are determined from the filtered set of comments.

7. The method of claim 1, further comprising causing a selectable option to be presented that switches the first plurality of comments and the second plurality of comments from being presented as received from one or more viewers of the media content item to being synchronized with playback of the media content item.

8. A system for presenting user comments during media playback, the system comprising:
a memory; and
a hardware processor that is configured to:
obtain a plurality of comments associated with a media content item;
determine a subset of comments from the plurality of comments, wherein each respective comment from the subset of comments includes a text portion from which at least one of a plurality of timed references to a position of the media content item is extracted from the respective comment;
determine a series of time windows, wherein each time window in the series of time windows corresponds to a segment of the media content item, and wherein the series of time windows includes at least a first time window and a second time window;
associate a first plurality of comments from the subset of comments with the first time window and a second plurality of comments from the subset of comments with the second time window,
wherein each respective timed reference from the plurality of timed references includes a reference to the position of the media content item extracted from each respective comment from the first plurality of comments and the second plurality of comments, and wherein each respective timed reference with a time within a respective time window from the series of time windows;
receive a request to receive comments that are synchronized with playback of the media content item; and
in response to receiving the request to receive comments that are synchronized with playback of the media content item, cause:
presentation of at least a portion of the first plurality of comments associated with the first time window within a timed comments interface concurrently with a first portion of the media content item that corresponds with the first time window and presentation of a comments interface that includes comments from the plurality of comments that are not within the subset of comments, and
presentation of at least a portion of the second plurality of comments associated with the second time window within the timed comments interface concurrently with a second portion of the media content item that corresponds with the second time window and presentation of the comments interface that includes the comments from the plurality of comments that are not within the subset of comments.

9. The system of claim 8, wherein the hardware processor is further configured to: associate a third plurality of comments from the subset of comments with the first time window.

10. The system of claim 9, wherein the hardware processor is further configured to determine a ranking for each of the third plurality of comments.

11. The system of claim 10, wherein the ranking is based on a number of endorsements associated with each respective comment from the third plurality of comments in the first time window.

12. The system of claim 9, wherein the series of time windows associated with the media content item is determined based on a density of comments having a given timed reference from the plurality of timed references, wherein the second plurality of comments are associated with the second time window having a start time and an end time in response to determining that the density of comments between the start time and the end time being greater than a threshold value.

13. The system of claim 8, wherein the hardware processor is further configured to generate a filtered set of comments by filtering the plurality of comments to remove comments containing objectionable content, wherein the subset of comments that contains the plurality of timed references to the media content item are determined from the filtered set of comments.

14. The system of claim 8, wherein the hardware processor is further configured to cause a selectable option to be presented that switches the first plurality of comments and the second plurality of comments from being presented as received from one or more viewers of the media content item to being synchronized with playback of the media content item.

15. A non-transitory computer-readable medium containing computer executable instructions and a processor that executes the instructions to:
obtain a plurality of comments associated with a media content item;
determine a subset of comments from the plurality of comments, wherein each respective comment from the subset of comments includes a text portion from which at least one of a plurality of timed references to a position of the media content item is extracted from the respective comment;

determine a series of time windows, wherein each time window in the series of time windows corresponds to a segment of the media content item, and wherein the series of time windows includes at least a first time window and a second time window;

associate a first plurality of comments from the subset of comments with the first time window and a second plurality of comments from the subset of comments with the second time window, wherein each respective timed reference from the plurality of timed references includes a reference to the position of the media content item extracted from each respective comment from the first plurality of comments and the second plurality of comments, and wherein each respective timed reference corresponds with a time within a respective time window from the series of time windows;

receive a request to receive comments that are synchronized with playback of the media content item; and in response to receiving the request to receive comments that are synchronized with playback of the media content item, cause:

presentation of at least a portion of the first plurality of comments associated with the first time window within a timed comments interface concurrently with a first portion of the media content item that corresponds with the first time window and presentation of a comments interface that includes comments from the plurality of comments that are not within the subset of comments, and presentation of at least a portion of the second plurality of comments associated with the second time window within the timed comments interface concurrently with a second portion of the media content item that corresponds with the second time window and presentation of the comments interface that includes the comments from the plurality of comments that are not within the subset of comments.

16. The non-transitory computer-readable medium of claim 15, wherein the processor further executes the instructions to associate a third plurality of comments from the subset of comments with the first time window.

17. The non-transitory computer-readable medium of claim 16, wherein the processor further executes the instructions to: determine a ranking for each of the third plurality of comments.

18. The non-transitory computer-readable medium of claim 17, wherein the ranking is based on a number of endorsements associated with each respective comment from the third plurality of comments in the first time window.

19. The non-transitory computer-readable medium of claim 16, wherein the series of time windows associated with the media content item is determined based on a density of comments having a given timed reference from the plurality of timed references, wherein the second plurality of comments are associated with the second time window having a start time and an end time in response to determining that the density of comments between the start time and the end time being greater than a threshold value.

20. The non-transitory computer-readable medium of claim 15, wherein the processor further executes the instructions to: generate a filtered set of comments by filtering the plurality of comments to remove comments containing objectionable content, wherein the subset of comments that contains the plurality of timed references to the media content item are determined from the filtered set of comments.

21. The non-transitory computer-readable medium of claim 15, wherein the processor further executes the instructions to: cause a selectable option to be presented that switches the first plurality of comments and the second plurality of comments from being presented as received from one or more viewers of the media content item to being synchronized with playback of the media content item.

\* \* \* \* \*